Nov. 5, 1968 R. W. REDLICH 3,409,890
LANDING SYSTEM FOR AIRCRAFT
Filed Dec. 28, 1966 5 Sheets-Sheet 1

Nov. 5, 1968  R. W. REDLICH  3,409,890
LANDING SYSTEM FOR AIRCRAFT
Filed Dec. 28, 1966  5 Sheets-Sheet 5

SIDEBAND DRIVE

"CARRIER" DRIVE

RECEIVED FIELD AT 0° ELEVATION

RECEIVED FIELD AT 6° ELEVATION

United States Patent Office 3,409,890
Patented Nov. 5, 1968

3,409,890
LANDING SYSTEM FOR AIRCRAFT
Robert Walter Redlich, Jannali, New South Wales, Australia, assignor to The University of Sydney, Sydney, New South Wales, Australia, a body corporate
Filed Dec. 28, 1966, Ser. No. 605,458
8 Claims. (Cl. 343—108)

ABSTRACT OF THE DISCLOSURE

A phase reference glide path system for aircraft utilizes a generated radio frequency signal divided into two channels, one amplitude modulates at a frequency $f_1$ and the other at a frequency $f_2$, and two outputs arranged by combining the two modulated waves, one output a carrier wave modulated with both frequencies $f_1$ and $f_2$ and the second output, a sideband wave containing an unmodulated carrier wave. The system includes a sideband antenna array for transmitting a sideband signal and a separate carrier antenna array for transmitting a carrier wave, there being substantially no reflected radiation of the transmitted radiation within the guidance region. The said pair of arrays are arranged with their centers separated by a distance that causes the phase difference between the sideband signal and the carrier signal to increase linearly with an elevation angle of an aircraft receiving said signals and to indicate the elevation of the aircraft by producing a preponderance of the frequency $f_2$ below the optimum glide path angle and the frequency $f_1$ above the optimum glide path angle.

This invention relates to an improved instrument landing system for aircraft (hereinafter referred to as a phase reference glide path system) and is concerned with the manner in which an indication of the glide path is transmitted to the pilot.

Accordingly to presently known glide path indicating systems a signal is radiated in the direction from which the aircraft is to approach, and gives to the pilot an audible or visible indication as to whether he is above or below the correct altitude at any particular point in his descending path.

According to the well known so-called null reference system a signal from a radio-frequency generator in the 329–335 mc. band is divided into two channels. One is amplitude modulated at say 90 cycles/sec., the other at say 150 cycles/sec. The two modulated waves are combined in a hybrid device, which has two outputs; one of which is a wave modulated with both 90 and 150 cycles/sec., the other being a wave containing no radio frequency carrier, but only the sidebands of the 90 and 150 cycle modulated waves. The second referred to output is conventionally designated "sideband." Each of these outputs is supplied to its own aerial. The sideband aerial is mounted on a mast usually about 34 feet off the ground, the carrier aerial being on the same mast, directly below the sideband aerial, and about 17 feet off the ground. The aerials themselves are simple horizontal half wave dipoles so that the radiation from them is horizontally polarized. In the 329–335 mc. band, the earth acts almost like a metallic reflector thus causing upward inclination of the reflected beams to provide the glide reference. The effect of the reflections from the earth can be accounted for by regarding the reflected radiation field as emanating from "image" aerials located 17 feet and 34 feet below the earth's surface.

The resultant combination of the reflected sidebands provides a condition in which the 150 c.p.s. modulated signal predominates below an optimum glide path angle, which is usually about 3°, while the 90 c.p.s. modulated signal predominates above the optimum glide path angle. Thus an aircraft having a receiver tuned to the proper frequency in the glide-path band picks up the radiation from the transmitting aerials and separates the 150 and 90 c.p.s. signals with electrical filters. The filter outputs are arranged to move the pointer of a meter which is visible to the pilot. This pointer is normally horizontal and output of the 150 c.p.s. filter moves it up or alternatively output from the 90 c.p.s. filter moves it down. On the glide-path, the two filter outputs are equal and the pointer remains horizontal. If the aircraft strays below path, the pointer moves up because the 150 c.p.s. filter output exceeds the 90 c.p.s. filter output. The opposite happens if the aircraft moves above the glide-path. Thus, the pilot follows the glide-path by flying the aircraft "toward the needle."

There are however, certain difficulties with the system above outlined. In particular, because reliable guidance is at times required down to elevation angles of 0.8° and because the glide path is formed with equal amounts of direct radiation and radiation reflected from the earth, in order to produce a good quality glide path the terrain extending from the transmitting aerial in the direction of incoming aircraft must have a length of at least 2500 feet. Moreover, the terrain in front of the aerial must be flat and level within 0.5°, should have uniform electrical properties and must be kept free of taxiing aircraft.

A further operational problem posed by the presently known null reference system is the inflexibility of the glide-path angle. This angle is determined solely by the height of the sideband aerial above the ground, and thus cannot be quickly and simply changed.

Several alternatives to the null-reference glide path system have been developed in an attempt to overcome the abovementioned difficulties, but none to date has been wholly satisfactory. Such alternatives have involved substantially more complicated arrangements which have the disadvantages of necessitating masts of increased height and which by virtue of their inherent construction and location are impracticable or impossible to adjust.

It is an object of the present invention to overcome the abovementioned difficulties by providing a stable glide path system which does not use ground reflections, which is compatible with existing transmitters and receivers and which may have the elevation angle thereof simply and easily changed by electrical means.

There is provided in accordance with the present invention a phase reference glide path system for aircraft including means generating a radio frequency signal, means dividing said radio frequency signal into two channels, one amplitude modulated at frequency $f_1$ and the other at frequency $f_2$, means combining the two modulated waves to produce two outputs, one, a carrier signal modulated with both frequencies $f_1$ and $f_2$ and the other a sideband signal consisting of frequencies $f_1$ and $f_2$, and an antenna transmitting said signals comprising a sideband antenna array transmitting said sideband signal and a separate carrier antenna array transmitting said carrier signal, both said arrays being constructed to substantially obviate reflected radiation of the transmitted radiation within the guidance region and said arrays having their centers separated to cause, in the absence of reflected radiation, the phase difference between the transmitted sideband and carrier signals to increase linearly with elevation angle, and means within an aircraft receiving said signal to give an indication of the elevation of the aircraft, a preponderance of the frequency $f_2$ occurring below the optimum glide path angle and of the frequency $f_1$ above the glide path angle.

There is further provided in accordance with the present invention an antenna array for use in a phase reference glide path system for aircraft comprising a sideband signal transmitting array and a carrier signal transmitting array arranged with its center spaced vertically from that of the sideband array, both said arrays being constructed to substantially obviate reflected radiation of transmitted radiation within the guidance region and said arrays having their centers separated to cause, in the absence of reflected radiation, a phase difference between the transmitted sideband and carrier signals which increases linearly with elevation angle, and each array being constructed to provide a low side lobe radiation in the direction of negative angles of elevation.

The invention will be more fully understood from the following description of a preferred arrangement thereof taken in conjunction with the drawings, in which.

Figure 4:
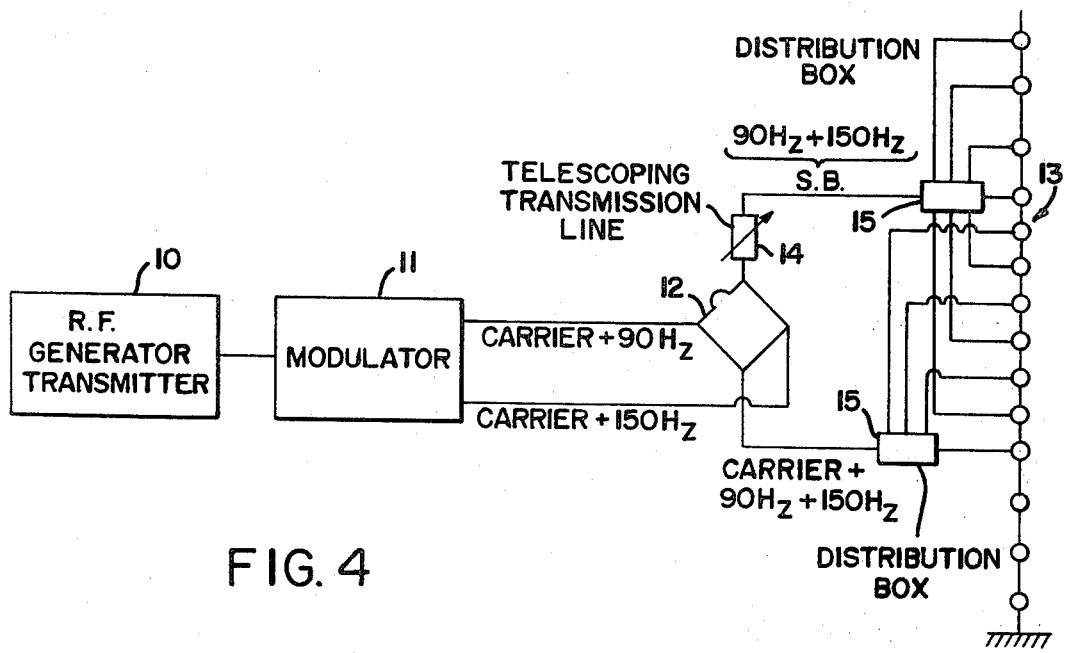
FIG. 4 is a block diagrammatic representation of a transmitter, including the antenna array of FIG. 1, in accordance with the present invention.

A phase reference glide path system in accordance with this preferred arrangement operates in much the same manner as the null reference system hereinbefore described but does not employ any ground reflections. Thus, with reference to FIG. 4, a signal from a radio frequency generator 10 is fed to a modulator 11 and divided into two channels, one modulated at 90 cycles/sec. and the other at 150 cycles/sec. The two modulated waves are combined in a hybrid device 12 and two outputs derived, one of which is modulated at both 90 and 150 cycles/sec. and the other (hereinafter referred to as "sideband") comprising sidebands of the 90 and 150 cycles/sec. modulated waves. Ground reflections about the guidance region are obviated by the use of an antenna 13 (FIG. 4, but see also FIGS. 1 and 2) arranged with vertically aligned sideband and carrier arrays, each of which have very low ground illumination into negative elevation; and by driving said arrays with a distribution of currents which results in a radiation pattern characterised by low ground illumination. To achieve such a radiation pattern, i.e., one which cuts-off at the horizon, the phase difference between the current fed to the respective elements of each array and the amplitude of such currents is selected in accordance with standard array design practice. It should be understood that these currents are not unique and that there may be many combinations that will achieve a desired result.

The vertically arranged arrays comprise a sideband array and a carrier array, each of which is preferably identical and each of which, for the purposes of this described arrangement, comprises seven similar elements having an overall height of 27 feet with the center of one array separated by about five wave lengths (i.e., about 15 feet) from the center of the other. The two arrays may overlap to limit the overall height to, for example, 42 feet, but at the same time provide the necessary array centre separation.

Figure 1:
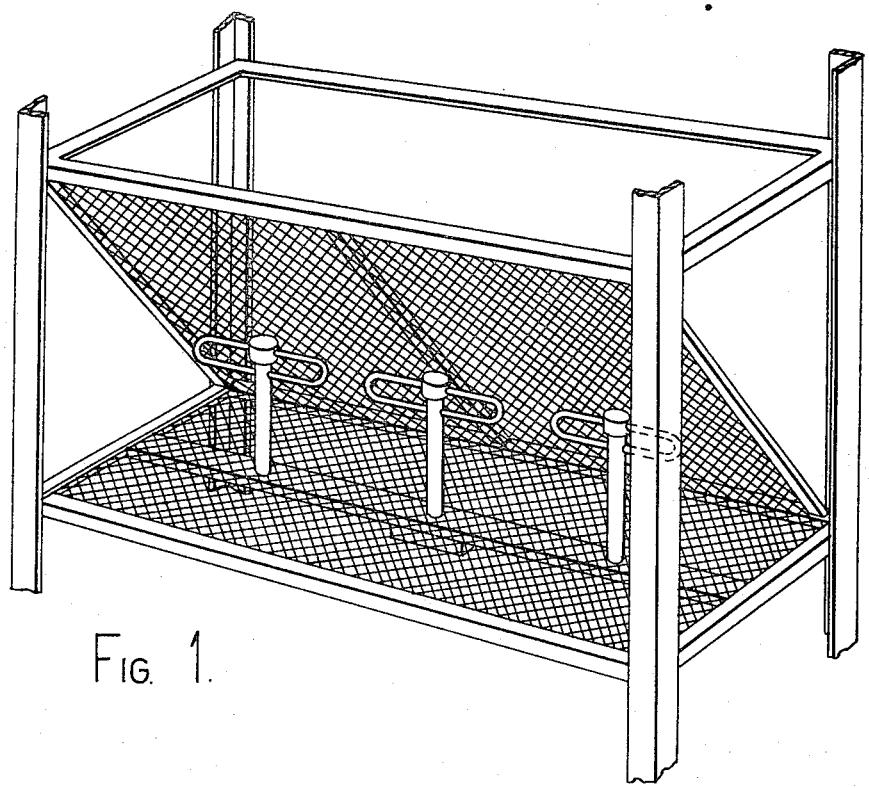
FIG. 1 shows a single element of an antenna array.
Figure 2:
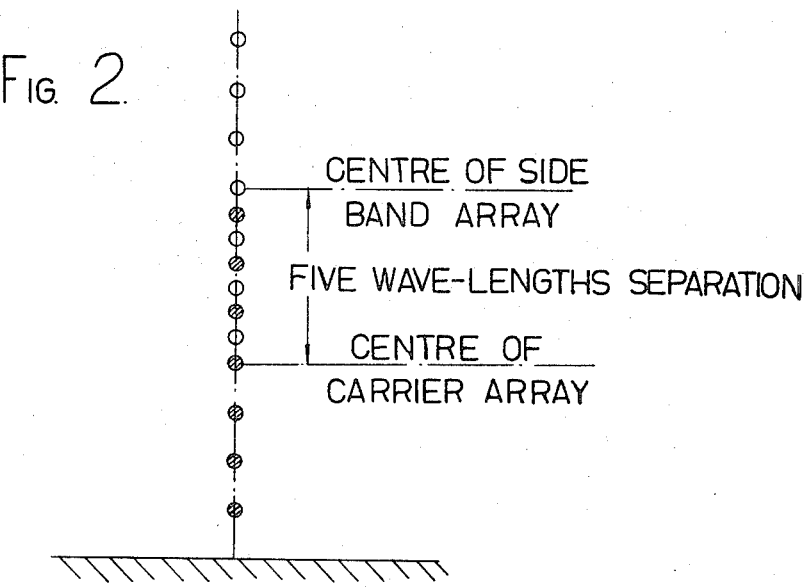
FIG. 2 depicts a schematic arrangement of a complete antenna array, comprising 14 single elements of the type shown in FIG. 1, elements of a sideband array being indicated by open circles and elements of a carrier array being indicated by shaded circles.

A single element is depicted in FIGURE 1 and the arrangement of vertical arrays is shown schematically in FIGURE 2, the elements of the "side-band" array being indicated by open circles and the elements of the carrier array being indicated by shaded circles.

This array provides means of making redundant the necessity of utilising the image (ground reflected) radiation hitherto found necessary for the generation of an effective or acceptable null reference glide path.

Figure 6:
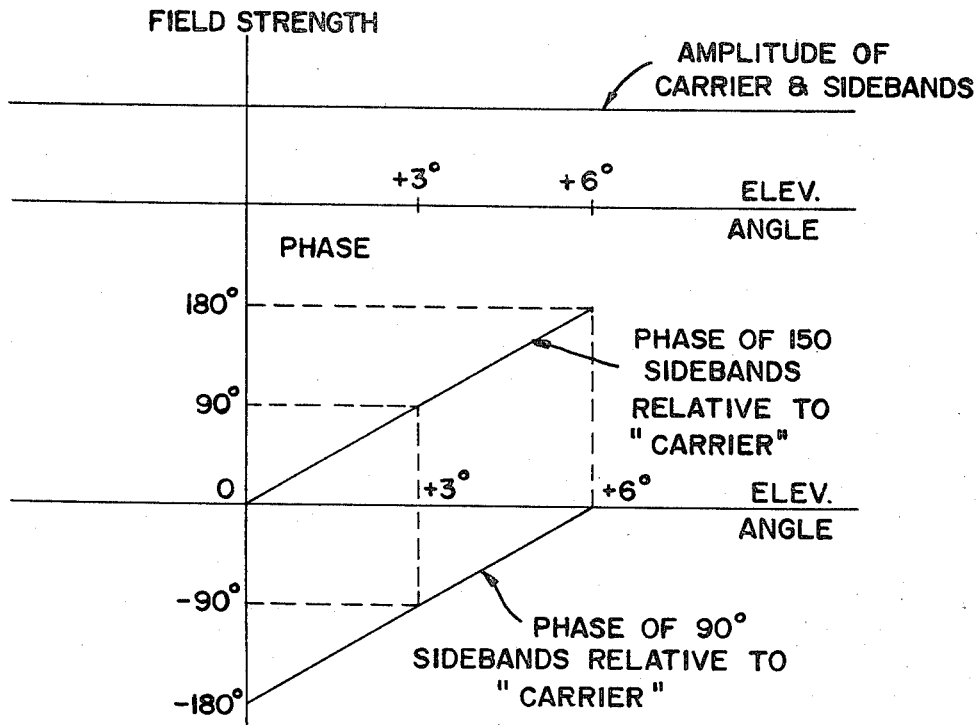
FIGS. 6, 7 and 8a to 8e are a series of phasor diagrams illustrating principles embodied in the present invention.

The fact that the image radiation can be made redundant has been verified by study of the radiation patterns which exist without any ground reflection. The amplitudes of both carrier and sideband signals, with no ground reflection, have been found not to vary with elevation angle at all, but it has been found that their relative phase does, due to the sideband and carrier arrays being vertically separated, in this case, by about 5 wavelengths. This is illustrated by the diagram of FIG. 6.

Figure 7:
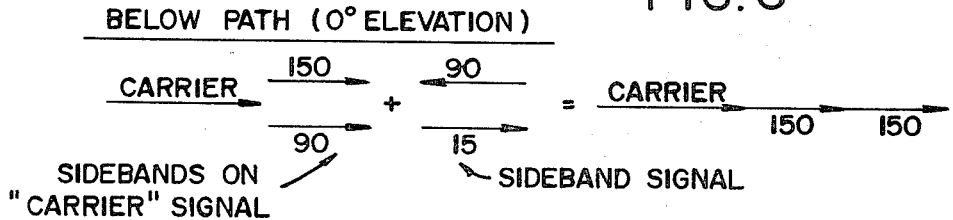
Figure 7:
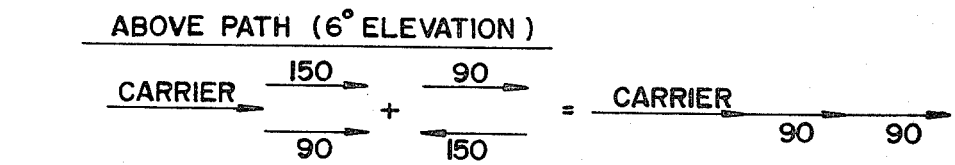
Figure 7:
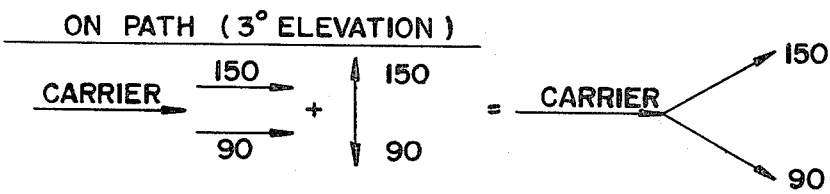

The 180° phase difference between 90 and 150 cycle/sec. sidebands is inherent in the output of the hybrid device mentioned previously in connection with the null-reference system. The information depicted in the FIG. 6 diagram can be used in the construction of phasor diagrams showing received radiation below path, on path, and above path, with no ground reflections as shown in FIG. 7.

The FIGURES 6 and 7 diagrams show how 150 c.p.s. predominates below path, 90 c.p.s. above path, and how the two sidebands are equal in magnitude on path. Generally, the resultant sideband signals are not in phase with the carrier, an effect which manifests itself as distortion of the audio tones detected by the aircraft receiver. This distortion can cause disturbances in the indicated glide path, however, means as hereinafter described have been found to reduce it to a negligible value.

As above stated, the present phase reference glide path systems is thus able to operate without ground reflections.

The relatively small aperture of 27 feet, in the array above described is made feasible because the radiation pattern of each array can be quite broad, provided that the side lobes directed toward the earth are very small compared with the signal radiated directly into the guidance region. Values may be chosen such that the beam width is, for example 14° and such that the sidelobes in the region say 0° to —10° elevation are at least 24dB below the signal level at, for example, +3° elevation. Thus by eliminating the necessity of image radiation use is made possible of a broad beam array of relatively small aperture.

With the system according to the present invention, exact congruence of the sidebands and carrier (an unmodulated R.F. wave) is unnecessary due to the fact that phase differences of up to about 30° will produce total distortion of less than 6%, which is within the specified limits set by various control bodies. Toleration of phase differing up to 30° in the guidance region, and still larger differences elsewhere, makes possible large reductions in the array aperture. In the herein described phase reference system, phase differences in the carrier (unmodulated R.F. wave) and resultant sidebands may range from 15° on path to 30° at the horizon and at 6° elevation. Total distortion is thus under these circumstances about 1.5%. To achieve this a modulation scheme as illustrated in FIGS. 8a to 8e may be applied.

Figure 8A:
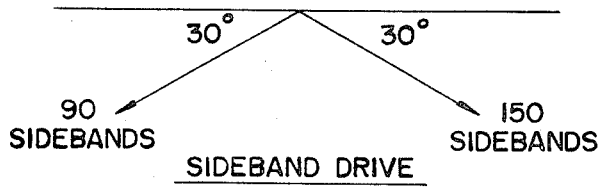
Figure 8B:
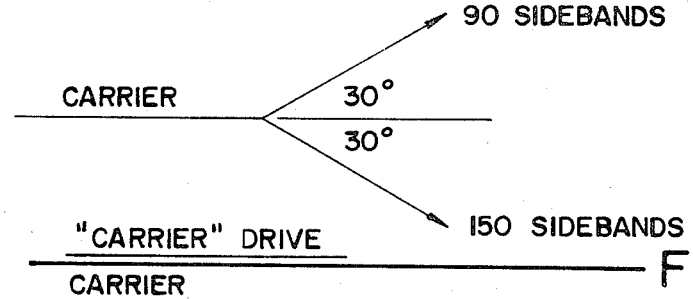

In FIG. 8a sideband drive is shown applied to the upper (sideband) array, while FIG. 8b shows carrier and sideband drive applied to the lower (carrier) array.

Figure 8C:
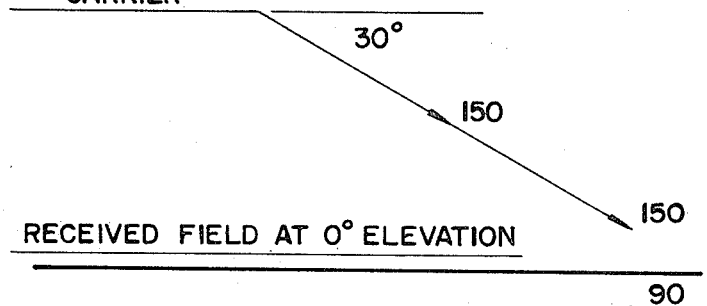

On the horizon, the resultant radiation field is found as the sum of the phasor diagrams shown in FIGS. 8a and 8b, since there is no relative phase shift between "carrier" and "sideband" radiation. Thus the received field is as shown in FIG. 8c.

Figure 8D:
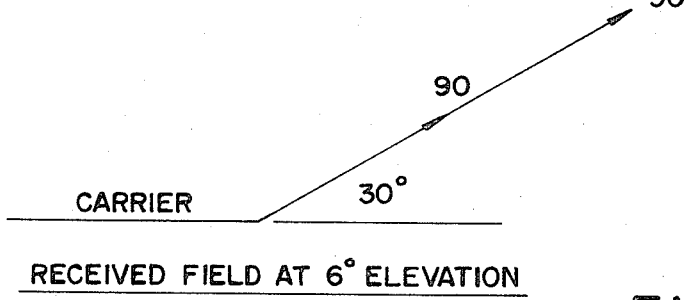

At approximately 6° elevation, "carrier" and "sideband" fields have shifted 180° relative to each other because of the 5 wavelength separation between the "carrier" and "sideband" arrays, so that the received field is as shown in FIG. 8d.

Figure 8E:
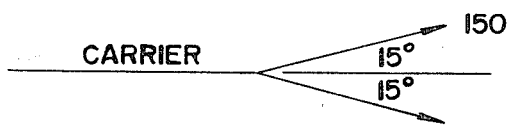

At 3° elevation, i.e. on the glide path, "carrier" and "sideband" fields have shifted 90° relative to each other, sidebands leading, so that the received field is as shown diagrammatically in FIG. 8e.

Figure 3:
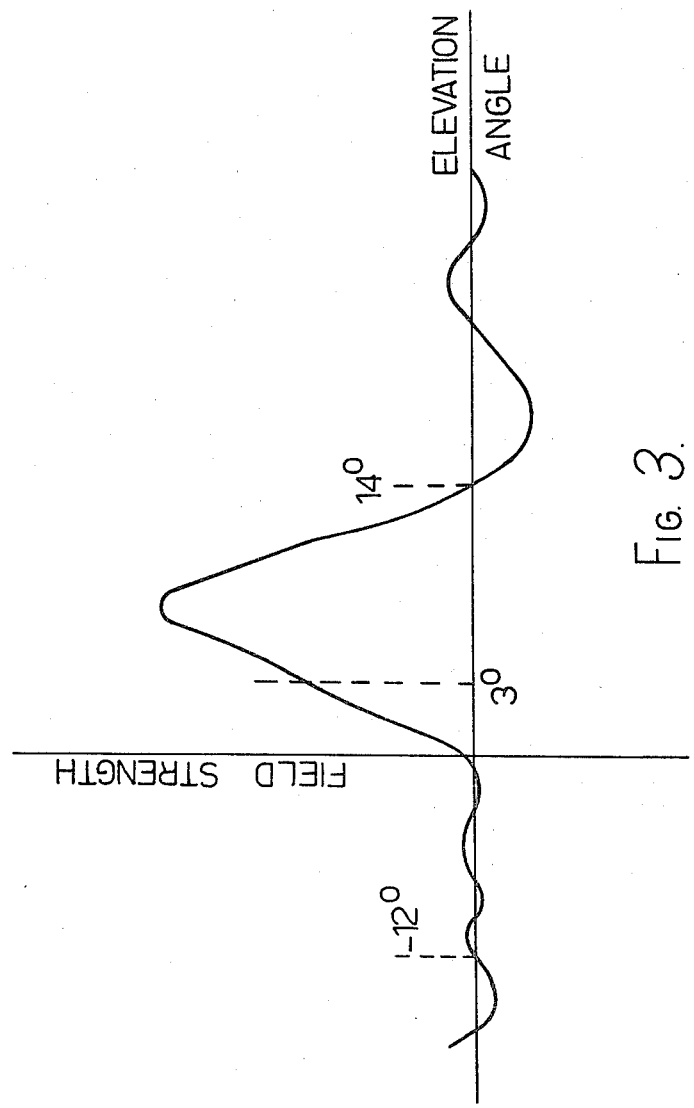
FIG. 3 depicts a radiation pattern which is common to the two arrays.

Thus, the phase reference glide path consists of two identical arrays, each having a radiation pattern with very low ground illumination and a broad main beam as shown in FIGURE 3 of the drawings.

The two arrays are preferably disposed on the same vertical line but with their centre about 5 wavelengths apart as hereinbefore mentioned and as shown in FIGURE 2 of the drawings.

The separation of the centres and absence of image radiation causes the phase differences between signals received from the two arrays to increase linearly with elevation angle. This increasing phase difference produces the required preponderance of 150 c.p.s. signal below the glide path and of 90 c.p.s. signal above the glide path.

In order to obviate the potentially dangerous signal radiated by conventional dipoles, that is radiation having a broad pattern which could be directed outside the guidance region (of for example ±8°) and scattered back into the guidance region by means of obstructions, the phase reference array according to the present invention preferably comprises a simple array of three dipoles mounted in a corner reflector of the type depicted in FIGURE 1.

This combination produces a relatively narrow azimuth pattern, and the corner reflector serves the useful purposes of reducing ground illumination and reducing coupling between vertically adjacent elements, so that theoretical vertical radiation patterns can be closely realized.

The phase-reference array does require some controlled reflecting terrain, since ground illumination is suppressed to only about 12° below the horizon. Thus considerable reflection takes place from the ground within for example 250 feet of the array, so that this ground must be flat and within about 2° of level, in order to prevent any of these reflections from entering the guidance region. However the provision of 250 feet of flat ground in front of the array does not present a severe problem, and represents a 10:1 easing of the siting difficulties, hereinbefore referred to.

Adjustment of the path angle may be achieved by shifting the phase of the sideband drive voltage relative to "carrier" drive voltage, with, for example, a length of telescoping transmission line (indicated diagrammatically by 14 in FIG. 4) in one of the feeders connecting the hybrid device 12 to an antenna feeder distribution base 15.

At the receiving end, i.e., in an aircraft approaching the guidance region, a receiver (FIG. 5) tuned to the glide path band frequency receives radiation from the transmitting antenna and separates the 90 and 150 cycles/sec. signals by means of filters, the two filter outputs then being fed to separate terminals of an indicating meter. Whilst the aircraft follows the glide path, the two inputs to the meter cancel and the meter needle, normally a horizontally movable needle, remains stationary. Should the aircraft stray below the optimum path, the 150 cycles/sec. input (for example) will predominate and the needle will be displaced upwardly. Similarly, if the aircraft strays above the optimum path, the 90 cycles/sec. input will exceed the 150 cycles/sec. input and cause the needle to be deflected downwardly.

Figure 5:
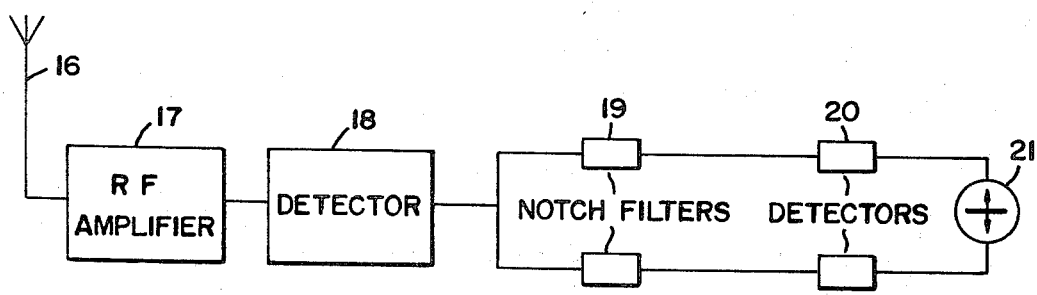
FIG. 5 is a block diagrammatic representation of an elementary receiving system, being for location in an aircraft and adapted for receiving radiation from the transmitting system at FIG. 4.

A typical receiver, suitable for use in conjunction with the present invention, is illustrated in FIG. 5 of the drawings; it comprising an antenna 16, a radio frequency amplifier 17, a detector 18, notch filters 19 and detectors 20 for separating and rectifying the 90 and 150 cycles/sec. signals, and an indicating meter 21.

What I claim is:

1. A phase reference glide path system for aircraft comprising:
    means generating a radio frequency signal;
    means dividing said radio frequency signal into two channels, one amplitude modulated at frequency $f_1$ and the other at frequency $f_2$;
    means combining the two modulated waves to produce two outputs, one, a carrier signal modulated with both frequencies $f_1$ and $f_2$ and the other a sideband signal consisting of frequencies $f_1$ and $f_2$, and an antenna transmitting said signals comprising a sideband antenna array transmitting said sideband signal and a separate carrier antenna array transmitting said carrier signal, said arrays being arranged with vertically aligned elements and being driven with a distribution of signal currents to substantially obviate reflected radiation of the transmitted radiation within the guidance region and said arrays having their centers separated to cause, in the absence of reflected radiation, the phase difference between the transmitted sideband and carrier signals to increase linearly with elevation angle; and
    means within an aircraft for receiving said signals to give an indication of the elevation of the aircraft, a preponderance of the frequency $f_2$ occurring below the optimum glide path angle and of the frequency $f_1$ above the glide path angle.

2. A phase reference glide path system as described in claim 1, wherein said means within the aircraft includes a tuned receiver for detecting and separating received signals and providing an output, and a visual indicating means receiving said output.

3. A phase reference glide path system as described in claim 1, including means for displacing the phase of the sideband signal drive voltage relative to the carrier signal drive voltage to effect adjustment of the optimum glide path angle.

4. An antenna array for use in a phase reference glide path system for aircraft comprising a sideband signal transmitting array and a carrier signal transmitting array arranged with its center spaced vertically from that of the sideband array, said arrays being arranged with vertically aligned elements and being driven with a distribution of signal currents to substantially obviate reflected radiation of transmitted radiation within the guidance region and said arrays having their centers separated to cause, in the absence of reflected radiation, a phase difference between the transmitted sideband and carrier signals which increases linearly with elevation angle, and each array being constructed to provide a low side lobe radiation in the direction of negative angles of elevation.

5. The antenna array according to claim 4 wherein said sideband array overlaps said carrier array.

6. The antenna array according to claim 5 wherein the sideband array and the carrier array each comprises a plurality of separate elements, each of said elements comprising a single array of three dipoles mounted upon a corner reflector.

7. The antenna array according to claim 4 in which the center of the sideband array is separated from the center of the carrier array by a distance equivalent to five wave lengths.

8. An antenna array for use in a phase reference glide path system for aircraft comprising a sideband signal transmitting array arranged with its center spaced vertically from that of a carrier signal transmitting array, said arrays being arranged with vertically aligned elements and being driven with a distribution of signal currents to substantially obviate reflected radiation of transmitted radiation within the guidance region, said arrays having their centers separated to cause, in the absence of reflected radiation, a phase difference between the transmitted sideband and carrier signals which increases linearly with elevation angle, each array being constructed to provide a low sidelobe radiation in the direction of negative angles of elevation, means for generating and feeding a drive voltage signal to each of said arrays to be radiated and transmission lines connecting said generating means to said arrays, at least one of which transmission lines being telescopic to shift the phase of the sideband drive voltage signal relative to the carrier drive voltage signal.

References Cited

UNITED STATES PATENTS

| | | | |
|---|---|---|---|
| 2,101,436 | 12/1937 | Leib | 343—108 |
| 2,307,184 | 1/1943 | Alford | 343—108 X |
| 2,373,090 | 4/1945 | Alford | 343—108 |
| 2,406,734 | 9/1946 | Alford | 343—108 |
| 2,419,551 | 4/1947 | Himmel | 343—108 |
| 2,610,321 | 9/1952 | Watts | 343—108 |

RODNEY D. BENNETT, *Primary Examiner.*

H. C. WAMSLEY, *Assistant Examiner.*